Aug. 25, 1964   R. S. LANGDON   3,145,959
MOTOR MOUNTING ARRANGEMENT
Filed March 8, 1962   2 Sheets-Sheet 1
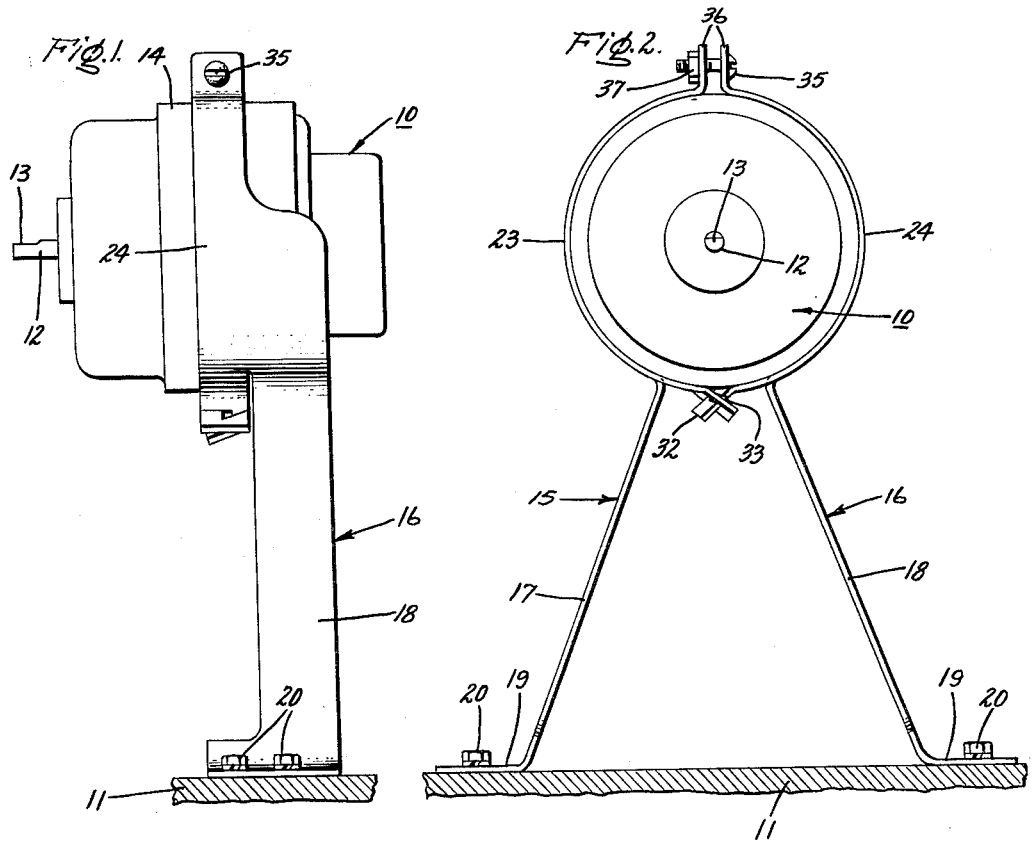
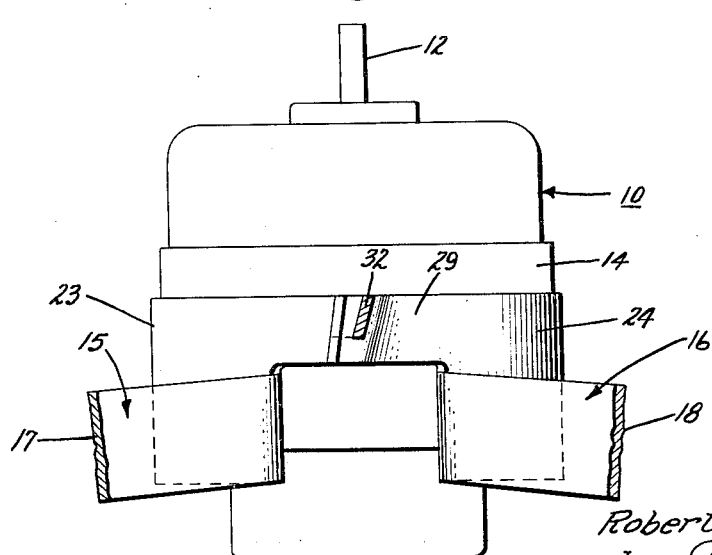
Inventor:
Robert S. Langdon,
by John M. Stoudt
Attorney.

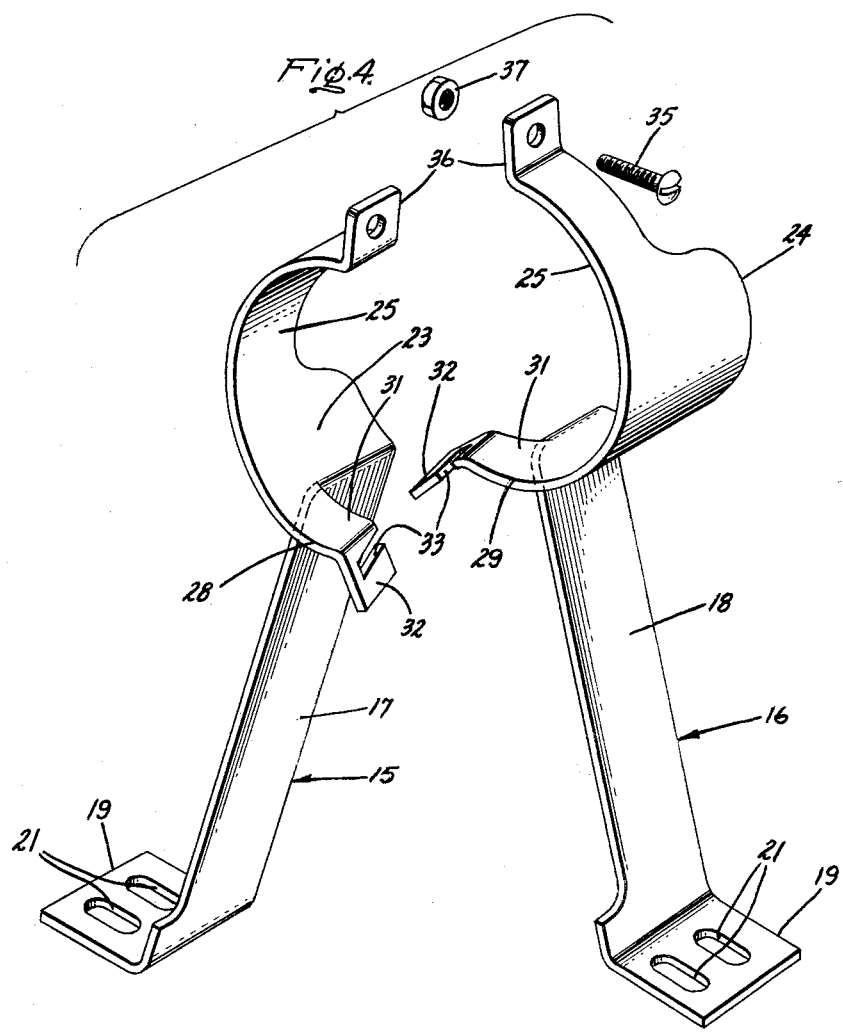

3,145,959
Patented Aug. 25, 1964

1

3,145,959
MOTOR MOUNTING ARRANGEMENT
Robert S. Langdon, Fort Wayne, Ind., assignor to General
Electric Company, a corporation of New York
Filed Mar. 8, 1962, Ser. No. 178,388
3 Claims. (Cl. 248—13)

This invention relates to an improved motor mounting arrangement, and more particularly to an improved vibration isolating mounting construction especially useful to support small machines having rotating parts, such as small horsepower motors, in spaced relation with respect to the stationary supporting structure.

It is important that a motor employed in connection with domestic appliances and other apparatus, e.g. for driving fans, be suitably supported so that vibrations and noises produced by the motor during its operation are not transmitted from the motor frame through the supporting structure to components of the apparatus which may be resonant to the exciting frequency of the energized motor. For instance, in the past there has been a practical difficulty encountered in the effective isolation of 120 cycle per second pulsating torques or torsional motor vibrations created in the stator during motor operation by employing a mounting arrangement which is economical to manufacture in mass production quantities. It is also desirable that the component parts of the mounting be simple in construction and relatively few in number while at the same time permitting easy and quick installation onto a motor, making further economies possible. Moreover, the mounting arrangement must be capable of satisfactorily supporting the motor for a long period of time without requiring replacement of parts, especially significant where the motor is mounted in relatively inaccessible locations.

Accordingly, it is an object of this invention to provide an improved mounting arrangement for a small motor or other machine which effectively isolates motor vibrations.

It is a further object of this invention to provide an improved motor supporting structure including relatively few simply constructed component parts which are extremely economical to manufacture in mass production quantities and are readily assembled to a motor or the like.

It is yet another object of the present invention to provide an improved low cost motor mounting structure having a torsional spring mass system for effectively limiting the transmission of torsional vibrations from the motor to the motor supporting base.

In carrying out the objects in one form thereof, I provide an improved mounting arrangement for supporting an electric motor in spaced relation on a base. The arrangement preferably includes a pair of elongated sheet metal members each having generally flat leg sections arranged to be secured to the base at their one ends and inclined toward each other at their other ends such that an extension of the planes defined by each leg section would intersect generally at the axis of the motor rotor. An arcuate clamping section as well as a locking section are integrally provided at the other end of the individual leg sections, with the locking sections extending transversely to the leg sections in interengaging relation to secure the members together in a predetermined manner. The arcuate clamping sections are disposed in an oppositely facing relationship when the members are secured together for clamping the motor. With the foregoing construction, the various sections of the members cooperate to support the motor in a rigid fashion and limit the transmission of torsional vibrations. Among other advantageous features of this arrangement, the

2 mounting itself is not only relatively inexpensive to manufacture in mass production quantities, but is also easily assembled together and readily installed as a unit in the desired location. In addition, the mounting assists in dissipating heat generated in the motor during operation, providing a motor cooling function.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

In the drawings:

FIG. 1 is a side view showing the preferred embodiment of the improved mounting arrangement including a pair of sheet metal members supporting a small electric motor in spaced relation on a base;

FIG. 2 is an end view of the arrangement illustrated in FIG. 1;

FIG. 3 is an enlarged bottom view of a portion of the arrangement shown in FIG. 2, to reveal more clearly the manner in which the mounting members are secured together; and FIG. 4 is a view in perspective of the cooperating sheet metal members of the mounting structure to illustrate detail.

Referring now to the drawings in more detail, for purposes of illustration the preferred form of the invention is shown supporting a fractional horsepower electric motor, generally indicated at 10, in spaced relation above a base plate 11 which may be a component part of the domestic appliance frame, such as a frame for a fan (not illustrated). Motor 10 of the exemplification is of conventional construction, with a standard rotor carrying shaft 12 having an end 13 projecting axially beyond a generally cylindrical motor housing 14 and adapted to mount and drive a fan or the like (not shown).

In order to isolate and limit the transmission of torsional vibrations from motor 10 to base 11 during motor operation, I provide an improved yet simply constructed resilient motor mounting arrangement which is economical to manufacture and may be quickly assembled on a motor at minimum cost. In the preferred embodiment, the arrangement includes a pair of elongated cooperating mirror-imaged members 15 and 16, formed from rectangular stiff resilient sheet material, e.g., commercially available steel stock. Members 15 and 16 comprise relatively flat leg sections 17 and 18, which preferably lie on opposite sides of the rotor shaft 12 in directions radial to and in planes intersecting approximately at the axis of the rotor shaft or the center of inertia of the motor. This relationship of the leg sections and motor tends to prevent axial and lateral motion of the motor. Leg sections 17 and 18 each terminate at the lower end (as viewed in the drawings) in a foot 19, which is bent away from the leg section of the other member, and provide the means for attaching members 15 and 16 to base 11. Bolts or screws 20, passing through elongated holes 21 in feet 19 and into the base 11, accomplish the fastening function.

A pair of arcuate shaped clamping sections or elements 23 and 24, integrally joined to the upper end of leg sections 17 and 18 respectively, include oppositely facing curved portions 25, each conforming substantially in configuration to the peripheral surface of motor housing 14 and being of an arcuate length somewhat less than 180° so as to permit intimate engagement over a large area with the housing 14.

With the motor 10 positioned between elements 23 and 24 in a loose manner, members 15 and 16 may be secured together beneath motor 10 by a pair of cooperating locking sections 28 and 29, which may be conveniently fashioned or cut from the upper edges of leg sections 17 and 18 and made an integral part of members 15 and 16. As shown (see in particular FIG. 4), the individual locking sections are each formed with an arcuate portion 31, which is in effect an extension of curved portion 25, projecting toward the other member. The free end portion or tab 32 of each locking section 28 and 29 is formed with a transverse slot 33 along one of its edges, extending partially across portion 32, the tabs being bent angularly away from the motor. With this construction, it is a simple matter to interlock sections 28 and 29 together at slots 33 thereby securing members 15 and 16 in a fixed relation. In addition, along with leg sections 17 and 18, the complementary interengaging sections 28 and 29 provide a resilient system for preventing or limiting the transmission of motor vibrations from the motor to base 11.

After the assembly of members 15 and 16 has been achieved in the foregoing fashion, clamping elements 23 and 24 may be drawn tightly around motor 10 by any suitable means. In the preferred embodiment, a single screw 35 projects through bent ends 36 of the clamping elements above motor 10, and with nut 37, maintains motor 10 firmly between and in intimate engagement with the elements. If desired, projections (not shown) may be provided in the side surfaces of the clamping elements, intermediate their ends, to cooperate with complementary recesses or slots on the motor periphery to assist in properly positioning the motor between the clamping elements. Conversely, the projections may be formd on the surface of the motor, with the accommodating recesses provided in the clamping elements 28 and 29.

It will be appreciated from the foregoing description that the present invention has many desirable features. For example, the fabrication of members 15 and 16 is not only exceedingly simple and inexpensive, requiring relatively few and low cost stamping and bending operations with little material waste, but in addition it will be further recognized that once members 15 and 16 have been secured together, with clamping elements 28 and 29 positioned around and in intimate contact with motor housing 14, the members serve a motor cooling function. By virtue of this intimate engagement and the unusually large heat radiating surfaces provided by members 15 and 16, the mounting of the present invention efficiently conducts heat away from the motor during operation and dissipates the heat to the surrounding atmosphere. Further, the supporting arrangement is extremely versatile in nature, easily installed as a unit with a minimum of expense, and is adapted to carry the motor in any position with respect to the stationary supporting frame or base. For instance, members 15 and 16 may mount the motor with the shaft exending in a horizontal or nonhorizontal position and will still provide the highly desirable vibration isolating function. Moreover, in spite of the fact that motor 10 may be held a sufficient distance from base 11 to permit a relatively large impeller or fan to be driven by shaft end 13 without interference from the base 11, the arrangement still effectively isolates pulsating torsional vibrations.

It should be apparent to those skilled in the art, that while I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. An electric motor, resilient mounting means for supporting said motor in spaced relation on a base, said mounting means comprising a pair of single piece sheet members each including an elongated inclined leg section arranged to be secured at one end to the base, an arcuate clamping section having one end fixedly joined to the other end of the associated leg section, and a locking section also fixedly joined to said other end of said associated leg section and extending generally transversely thereto, said locking sections being arranged to interengage each other thereby to secure said members together, said arcuate clamping sections being disposed in an oppositely facing relationship when said members are secured together clamping said motor therebetween, means for fastening said clamping sections together at their other ends whereby said clamping sections, locking sections, and leg sections cooperate to support the motor in a rigid manner and limit the transmission of torsional vibrations from the motor to the base.

2. A resilient motor mounting for supporting an electric motor in spaced relation on a base comprising a pair of single piece elongated substantially flat sheet metal leg sections arranged to be secured to the base at their one ends and inclined toward each other at their other ends, connecting means fixedly securing said leg sections together at said other end and causing said leg sections to form a resilient system, said connecting means including a pair of cooperating extensions each integrally joined at one end to one of the leg sections and having a free end projecting toward the other extension, said extensions being interlocked together at their free ends solely by the interengagement between said free ends, and a pair of arcuate shaped sheet metal clamping elements secured to said leg sections at said other ends and arranged for clamping around the motor, whereby said clamping elements and leg sections cooperate to support the motor in a rigid manner and limit the transmission of torsional vibrations from the motor to the base.

3. A resilient motor mounting for supporting an electric motor in spaced relation on a base comprising a pair of elongated substantially flat sheet metal leg sections arranged to be secured to said base at their one ends and inclined upwardly toward each other at their other ends on planes intersecting generally at the axis of the motor rotor, connecting means fixedly securing said leg sections together at said other ends and causing said leg sections to form a resilient spring system, said connecting means including a pair of interlocking extensions each having a slot formed on one edge thereof and extending in a transverse direction partially across said extension, each of said extensions projecting from said other end of said leg section toward and locked with the other extension at said slots, and a pair of arcuate shaped sheet metal clamping elements integrally joined to said leg sections adjacent said connecting means and arranged for clamping around the motor, whereby said clamping elements, connecting means and leg sections cooperate to support said motor in a rigid manner and limit the transmission of torsional vibrations from the motor to the base.

References Cited in the file of this patent

UNITED STATES PATENTS 1,783,874     Dryden _____ Dec. 2, 1930